Figure 3:
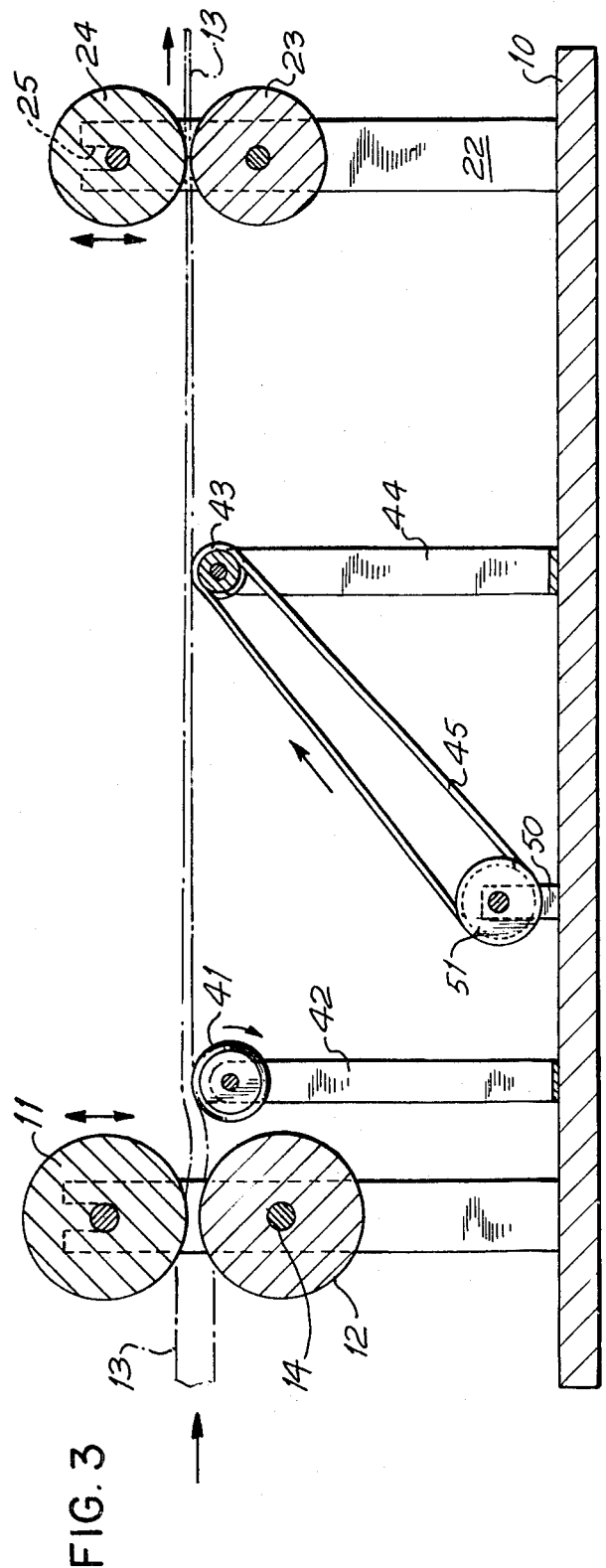

United States Patent
Schafer

[15] 3,653,793
[45] Apr. 4, 1972

[54] DEVICE FOR MAKING STRUDEL LEAF DOUGH SHEET

[72] Inventor: Leonhard Schafer, 2770 Briggs Avenue, New York, N.Y. 10458

[22] Filed: July 27, 1970

[21] Appl. No.: 58,223

[52] U.S. Cl............................425/328, 425/336, 425/366, 425/369
[51] Int. Cl..............................................A21c 3/00
[58] Field of Search .......................107/10–13, 1, 5, 107/34, 57, 1 R, 1 A, 57 D; 38/143; 18/2 A, 9, 10, 2 C, 2 F, 1 FB; 100/70, 74, 94

[56] References Cited

UNITED STATES PATENTS

| | | | |
|---|---|---|---|
| 3,004,284 | 10/1961 | Limbach | 18/1 FB |
| 3,110,927 | 11/1963 | Koppenhele et al. | 18/1 FB |
| 3,399,472 | 9/1968 | Evans | 38/143 |
| 3,548,757 | 12/1970 | Verheis | 107/012 |

*Primary Examiner*—Jordan Franklin
*Assistant Examiner*—Geo. V. Larkin
*Attorney*—Frank Makara

[57] ABSTRACT

This device stretches pastry dough simultaneously both laterally and longitudinally to form a moving gradually thinning sheet of said dough. In this device the dough sheet of relatively large thickness is fed into a set of front rollers to be then seized by a plurality of seizure rollers disposed in two rows in a divergent or V-shaped manner and engaging the respective opposing longitudinal edges of the dough sheet. The seizure rollers of each divergent row are provided with top and bottom rollers having grooved portions of mating relationship and adapted to seize the edge of said dough sheet. The speed of the dough sheet is increased uniformly as it approaches the exit end of the device. This speed is attained by use of driven pulleys of suitable size connected to the grooved rollers. An idler and a driven roller is provided between the opposing rows of divergent rollers to support the center area of the gradually thinning dough sheet and thus prevent any tearing of it.

4 Claims, 5 Drawing Figures

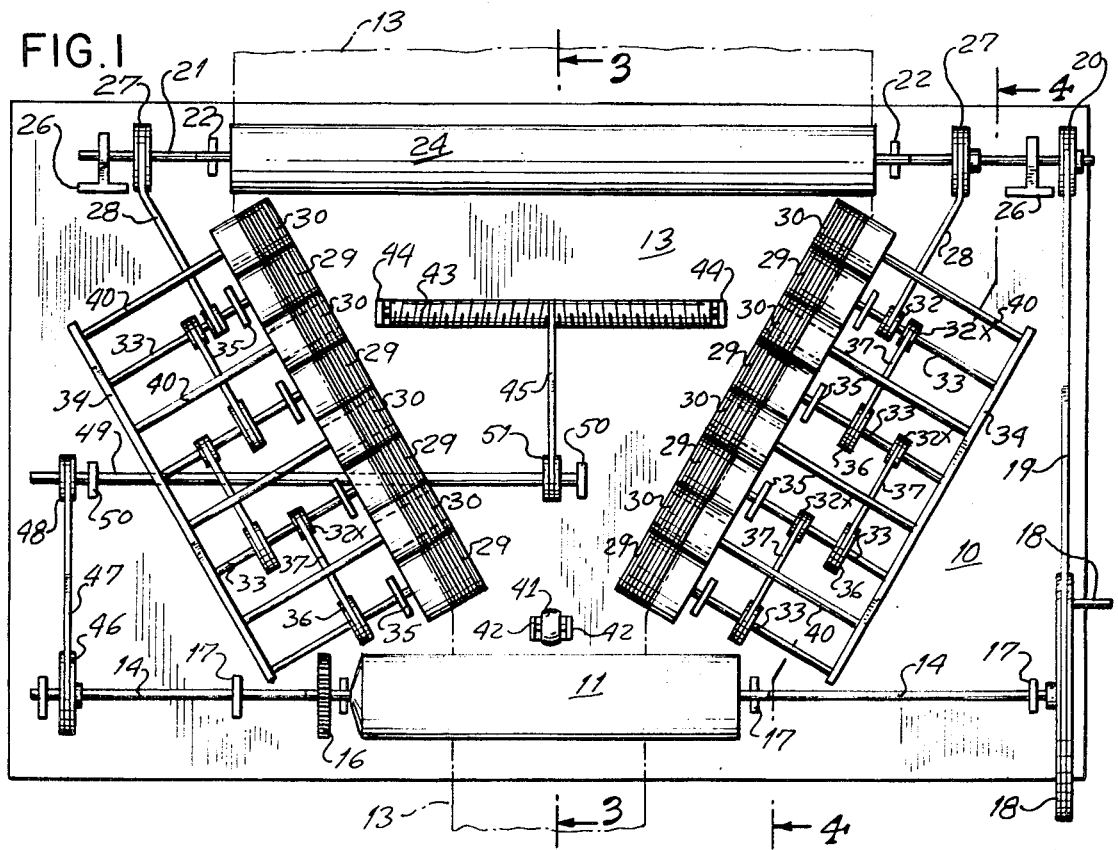

DEVICE FOR MAKING STRUDEL LEAF DOUGH SHEET

In the prior art, strudel dough is made by hand and is thus a time consuming and costly process.

The embodiment presented in this invention employs two rows of substantially identical configuration of divergently disposed mated top and bottom seizure rollers, which rollers seize the moving edges of a sheet of pastry dough as it emerges from a pair of front smoothing rollers. These grooved rollers pull the dough sheet forward with uniformly increasing speed as they also pull said sheet sidewards uniformly. Thus the entire area of the dough sheet is uniformly stretched as it progresses from the front pair of smoothing rollers toward and to the rear pair of smoothing exit rollers. In effect the opposing rows of divergent grooved rollers are mirror images of each other.

It is an object of this invention to provide a mechanical device for making strudel dough of a very thin quality.

It is another object to provide a device that produces a narrow sheet of dough of a relatively thick quality at a front pair of rollers, which then seizes the moving dough as it emerges from said front rollers at the opposing edges and advances it forwardly as it stretches it laterally.

It is another object to provide a strudel dough making device without tearing it as it advances toward the exit rollers.

Figure 4:
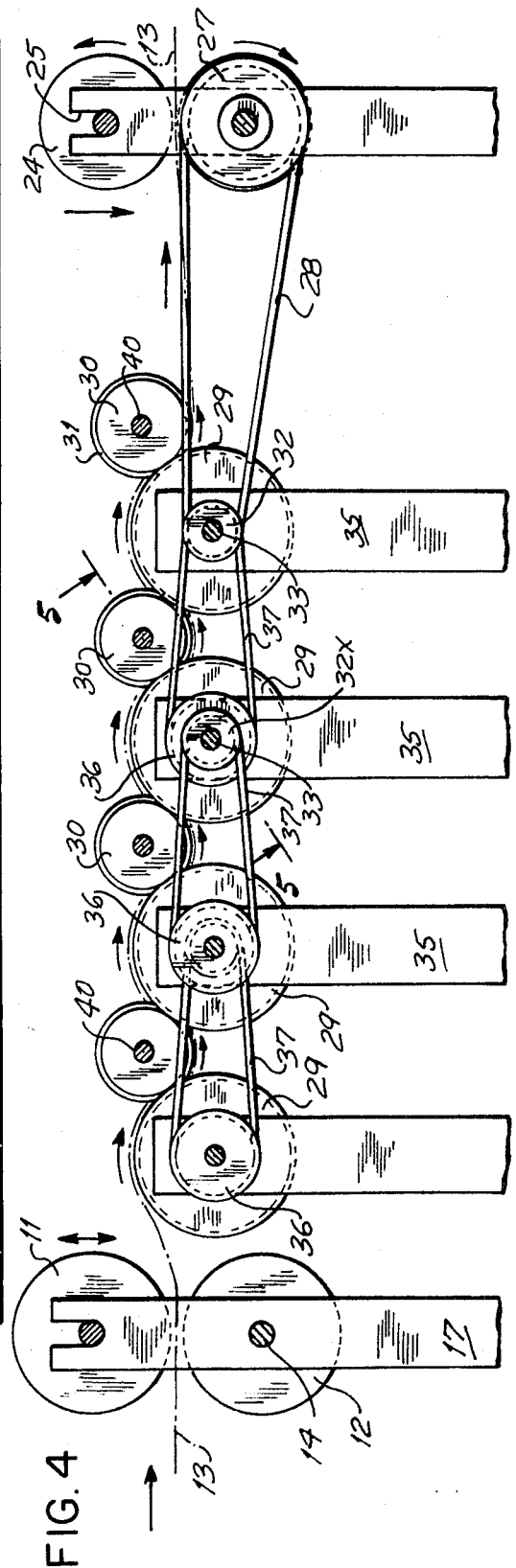

These and other objects of this invention will become apparent upon reading the following disclosure of an illustrative embodiment in which FIG. 1 is a top plan view of the strudel machine showing a left side and a right side bank of corrugated rollers used to pull the dough sheet sidewards while propelling it forward and further showing a single centrally disposed divergently spiraled roller used to propel the center of the strudel sheet forward with suitable stretching, FIG. 2 is a front view of the machine showing a pair of feed rollers through which the relatively thick dough sheet is drawn and also showing a hand crank for operating the machine, FIG. 3 is a partial sideview taken substantially on line 3—3 of FIG. 1 and showing the gradual thinning of the dough sheet as it is drawn out laterally and forwardly as it passes from the front feed rollers to the rear exit rollers, FIG. 4 is a side view of the machine taken on line 4—4 of FIG. 1 and showing the various pulley sizes and arrangement to effect a uniformly increasing speed of the dough sheet from the front to the rear of the machine and FIG. 5 is a section view taken on line 5—5 of FIG. 4 and showing the manner of seizure of the sheet of strudel dough between a bottom driven suitably circularly corrugated roller at its free end and a top idler roller similarly corrugated to mate with the bottom driven roller.

Turning to the drawing, the strudel sheet making machine is disposed on a platform 10. A pair of front feed rollers 11 and 12 are suitably spaced-apart to receive the relatively thick stretchable dough sheet 13 (shown in dotted outline) FIG. 1. The bottom feed roller 12 is provided with a gear 15 at one end secured to the roller axle 14, said gear 15 mating with gear 16 secured to and motivating top feed roller 11. Axle 14 is supported in upright supports 17 and is secured to a hand crank in the illustrative embodiment shown. Other motivating power may be used in lieu of the crank 18, for example, an electrical motor.

A belt drive 19 is disposed over a suitably small pulley 20 secured to rear axle 21. Axle 21 is supported on upright supports 22 and is secured to bottom roller 23. A top idler roller 24 is disposed in the U-shaped channels 25 of upright supports 22 and rests on the thin strudel dough passing between rollers 23 and 24. Additional supports 26 are provided for axle 21.

A pair of suitably large suitably deeply grooved pulleys 27 are disposed on rear axle 21. These pulleys 27 motivate respectively a right bank of end corrugated dough stretching rollers and a left bank of identical rollers by means of belt drives 28.

The pair of banks of end corrugated or channeled rollers are angularly and laterally disposed to form a V-shaped configuration disposed away from the front rollers 11 and 12. The bottom driven rollers 29 are driven by pulleys of preselected size and arrangement so as to produce a uniformly increasing or stretching speed on the dough sheet from the front of the machine to the rear thereof. The top rollers 30 are held down by gravity and are non-driven or idler rollers. Rollers 30 are made to mate with rollers 29 so that the round corrugations of a roller 30 mate with the channels of a roller 29 and vice versa, thereby seizing the strudel sheet located therebetween. The opposed angular disposition of two banks or rows of corrugated seizure rollers causes the dough sheet to be stretched sidewardly and forwardly with consequent loss of thickness.

As shown in FIG. 4, a belt 28 engages pulley 27 and a pulley 32 of lesser diameter secured to axle 33 of a driven roller 29. The axles 33 of driven rollers 29 are disposed in suitable apertures of upright plate 34 secured to platform 10 and also in individual upright supports 35. A small pulley 32X engages a suitably larger pulley 36 by belt 37 disposed on axle 33 of the adjacent roller 29. This arrangement of small pulley 32X on an axle 33 by way of a belt 37 engaging a larger pulley 36 secured to an axle 33 of an adjacent roller 29 is repeated a plurality of times to produce, for example, a series bank of four driven rollers 29, the rotational speed of each being increased as the strudel sheet 13 moves from the front of the machine to the rear to produce stretching action on said sheet.

The idler rollers 30 are disposed on non-driven axles 40 and are positioned between the suitably spaced-apart adjacent rollers 29 so as to equally engage them, except for the rearmost roller 30. The corrugations or annular ridges 31 of a roller 30 mate with the receiving annular channels 31X of a roller 29 (FIG. 5) to effect a seizure in depth of the edge of the strudel sheet. Moreover, the weight of the roller 30 pushes down the strudel sheet between the rollers 29 to stretch the sheet therebetween.

In the operation of the machine, the strudel sheet of a thickness of about one-quarter to about one-half inch is introduced between rollers 11 and 12 and emerges from rollers 24 and 25 with a thickness of about 0.005 inches and translucent to light. The rollers of this machine that contact the dough sheet are made for sanitary reasons of stainless steel, aluminum or plastic material.

To support the thick sheet of dough immediately behind rollers 11 and 12 a support idler roller 41 is provided. The roller 41 is disposed in a bracket having upright arms 42.

An auxiliary roller 43 is divergently grooved towards its edges and provided with a center channel to receive a pulley belt. Roller 43 both supports the strudel sheet and helps in stretching it longitudinally and laterally, thereby preventing tears in the sheet. The roller 43 is supported on each end by supports 44 and a drive belt 45 is provided in its center channel to produce the desired rotation. Power is supplied to roller 43 from the driven axle 14 by means of a large pulley 46 secured thereto and a belt 47 engaging a smaller pulley 48 secured to a secondary axle 49. Axle 49 is journaled into supports 50 and is provided with a pulley 51 to receive belt 45. The size relationship of pulleys 46,48 and 51 is such as to propel the center of the strudel sheet on roller 43 at substantially the same speed as that of the seized outer edges, thereby preventing a tearing of the sheet.

I claim:

1. A strudel sheet forming machine comprising a front pair of driven rollers for introducing a relatively thick strudel dough sheet; a pair of opposed laterally and angularly disposed rows of end-corrugated rollers, said rows of corrugated rollers being disposed in a V-shaped configuration away from said pair of driven rollers, each row of rollers having a bottom plurality of linear spaced-apart driven end-channel corrugated rollers and a top plurality of non-driven idler ridge end-corrugated rollers, said top rollers being respectively disposed between a pair of bottom driven rollers in corrugated mated relationship and adapted to seize a respective edge of said strudel sheet; pulley means for interconnectedly engaging said bottom driven rollers for increasing the speed thereof and of the seized sheet from the front end to the rear end of the machine whereby the opposed edges of the seized strudel sheet are uniformly pulled sidewardly to produce a stretched uniformly thin strudel sheet.

2. The strudel sheet making machine of claim 1, having a divergently spiral roller of two half sections centrally disposed between said two rows of sheet seizing rollers, said spiral roller being suitably driven and supporting said sheet thereon whereby said sheet is stretchingly propelled both forwardly and sidewardly by said spiral roller.

3. The machine of claim 1, comprising a base plate fixedly securing said front and said exit pairs of strudel conveying rollers; axle means fixedly secured to the center of each roller at the non-corrugated end thereof; an upright apertured plate secured fixedly behind each row of rollers to said base receiving the free end of each roller axle ; said pulley means comprising pairs of co-acting large and small pulleys disposed adjacently on said bottom roller axles and connected by a belt whereby said bottom driven rollers are provided with a uniformly increasing rotational speed adapted to stretch said sheet of strudel dough.

4. A strudel sheet forming machine comprising a base plate; a front relatively short length pair of driven rollers for engaging a relatively thick strudel sheet secured by supports to said base plate; a pair of angularly disposed opposed banks of rollers having top idler rollers disposed between and engaging adjacent bottom driven rollers, said rollers each having dough sheet seizure corrugations at one end and an axle centrally in the roller face at the other end, said corrugations of said idler rollers co-acting in mating relationship with the corrugations of said bottom rollers to seize an edge of said sheet; an upright apertured plate secured to said base behind each bank of rollers and receiving the axle free ends in the apertures thereof; pulley means having a small diameter pulley secured to a driven bottom roller axle and connected by a belt to a larger diameter pulley secured to the axle of an adjacent spaced-apart roller to effect a varying rotational speed relationship among said bottom driven rollers and a consequent speed effect on the seized strudel sheet; a driven divergently groove spiraled roller disposed between said banks of rollers and secured to said base plate and supporting said strudel sheet, said spiral roller propelling said sheet forwardly and equally sidewardly to effect a stretching of said sheet; and a rear pair of exit rollers engaging the thin stretched strudel sheet therebetween, said exit rollers having a bottom driven roller and a top idler roller, each of a length to support the laterally stretched sheet.

* * * * *